United States Patent
Palin et al.

(10) Patent No.: US 7,965,982 B2
(45) Date of Patent: Jun. 21, 2011

(54) RECONFIGURABLE WIRELESS COMMUNICATIONS DEVICE AND RADIO

(75) Inventors: Arto Palin, Viiala (FI); Mauri Honkanen, Tampere (FI); Mika Kasslin, Espoo (FI)

(73) Assignee: Nokia Corporation, Espoo (FI)

( * ) Notice: Subject to any disclaimer, the term of this patent is extended or adjusted under 35 U.S.C. 154(b) by 439 days.

(21) Appl. No.: 10/959,105

(22) Filed: Oct. 7, 2004

(65) Prior Publication Data

US 2006/0079178 A1  Apr. 13, 2006

(51) Int. Cl.
*H04B 7/00* (2006.01)

(52) U.S. Cl. .................. 455/41.2; 455/41.3; 455/127.4; 455/552.1; 455/553.1

(58) Field of Classification Search ................ 455/41.2, 455/552.1, 41.3, 127.4, 553.1
See application file for complete search history.

(56) References Cited

U.S. PATENT DOCUMENTS

| | | | | |
|---|---|---|---|---|
| 5,815,525 | A * | 9/1998 | Smith et al. | 375/130 |
| 5,912,921 | A | 6/1999 | Warren et al. | |
| 6,301,484 | B1 | 10/2001 | Rogers et al. | |
| 6,788,230 | B2 | 9/2004 | Ahn | |
| 7,039,027 | B2 * | 5/2006 | Bridgelall | 370/329 |
| 7,046,716 | B1 * | 5/2006 | Miao | 375/130 |
| 7,274,652 | B1 * | 9/2007 | Webster et al. | 370/204 |
| 7,733,831 | B2 * | 6/2010 | Samuel et al. | 370/335 |
| 2003/0161288 | A1 | 8/2003 | Unruh | |
| 2004/0043758 | A1 * | 3/2004 | Sorvari et al. | 455/414.1 |
| 2004/0121753 | A1 * | 6/2004 | Sugar et al. | 455/333 |
| 2004/0147223 | A1 * | 7/2004 | Cho | 455/552.1 |
| 2004/0162023 | A1 * | 8/2004 | Cho | 455/41.1 |
| 2004/0204031 | A1 * | 10/2004 | Kardach et al. | 455/552.1 |
| 2004/0259544 | A1 * | 12/2004 | Amos | 455/435.1 |
| 2005/0032537 | A1 | 2/2005 | Miyashita | |
| 2005/0068965 | A1 | 3/2005 | Lin et al. | |
| 2005/0094744 | A1 * | 5/2005 | Ramachandran et al. | 375/316 |
| 2005/0097356 | A1 * | 5/2005 | Zilliacus et al. | 713/201 |
| 2005/0099943 | A1 * | 5/2005 | Naghian et al. | 370/229 |
| 2005/0147071 | A1 | 7/2005 | Karaoguz et al. | |
| 2005/0266808 | A1 * | 12/2005 | Reunamaki et al. | 455/101 |
| 2006/0084469 | A1 * | 4/2006 | Malone et al. | 455/552.1 |
| 2006/0094401 | A1 | 5/2006 | Eastlake, III | |
| 2006/0121858 | A1 | 6/2006 | Tanaka et al. | |
| 2006/0291419 | A1 | 12/2006 | McConnell et al. | |

FOREIGN PATENT DOCUMENTS

EP  0941002 A2  9/1999

(Continued)

OTHER PUBLICATIONS

Lawrence Jarrett Malone, Transmitter and Receiver Architecture for Multi-mode Wireless Systems, U.S. Appl. No. 60/551,344.*
U.S. Appl. No. 60/551,344, filed Mar. 2004, Lawrence Jarrett Malone.*
U.S. Appl. No. 11/497,253, filed Aug. 2, 2006, Kahola et al.
Korean Intellection Property Office Non-Final Rejection for Korean Patent Application No. 10-2007-7010270 dated Jan. 4, 2010.

(Continued)

*Primary Examiner* — Tuan H Nguyen
(74) *Attorney, Agent, or Firm* — Locke Lord Bissell & Liddell (57) ABSTRACT

An apparatus for short-range wireless communications includes a transceiver configured to operate different modes. Each of these modes corresponds to a particular wireless link type. In addition, the apparatus includes a controller for selectively activating one of the operational modes of the transceiver. The controller sends one or more operational parameters to components within transmitter and receiver portions of the transceiver, such as filters, amplifiers, analog-to-digital converters, and digital-to-analog converters. Such parameters control the operational characteristics of these components.

40 Claims, 9 Drawing Sheets

FOREIGN PATENT DOCUMENTS

| | | |
|---|---|---|
| KR | 200365047 | 8/2003 |
| WO | 03/058894 A1 | 7/2003 |
| WO | WO 03/105418 * | 12/2003 |
| WO | WO03/105418 A2 | 12/2003 |

OTHER PUBLICATIONS

International Search Report for International Application No. PCT/IB/2007/001835 mailed on Feb. 28, 2008.

* cited by examiner

RECONFIGURABLE WIRELESS COMMUNICATIONS DEVICE AND RADIO

FIELD OF THE INVENTION

The present invention relates to wireless communications. More particularly, the present invention relates to devices having the capability to communicate across more than one type of communications link.

BACKGROUND OF THE INVENTION

Wireless access communications technologies, such as Bluetooth, wireless local area networks (WLAN), ultra wideband (UWB), and sensor radios (e.g. ZigBee) are becoming increasingly available and important for portable devices. Such technologies often complement more traditional cellular access technologies to provide a portable device with expanded communications capabilities.

Each individual access technology is often well-suited for particular types of uses and applications. Thus, for a device to provide its user with the ability to experience a multitude of applications (e.g. wireless headset, fast internet access, synchronization, and content downloading), it is desirable for a device to support multiple access technologies.

WLANs are local area networks that employ high-frequency radio waves rather than wires to exchange information between devices. IEEE 802.11 refers to a family of WLAN standards developed by the IEEE. In general, WLANs in the IEEE 802.11 family provide for 1 or 2 Mbps transmission in the 2.4 GHz band (except IEEE 802.11a) using either frequency hopping spread spectrum (FHSS) or direct sequence spread spectrum (DSSS) transmission techniques. Within the IEEE 802.11 family are the IEEE 802.11b, IEEE 802.11g, and IEEE 802.11a standards.

IEEE 802.11b (also referred to as 802.11 High Rate or Wi-Fi) is an extension to IEEE 802.11 and provides data rates of up to 11 Mbps in the 2.4 GHz band. This allows for wireless functionality that is comparable to Ethernet. IEEE 802.11b employs only DSSS transmission techniques. IEEE 802.11g provides for data rates of up to 54 Mbps in the 2.4 GHz band. For transmitting data at rates above 20 Mbps (or when all devices are IEEE 802.11g capable), IEEE 802.11g employs Orthogonal Frequency Division Multiplexing (OFDM) transmission techniques. However, for transmitting information at rates below 20 Mbps, IEEE 802.11g employs DSSS transmission techniques. The DSSS transmission techniques of IEEE 802.11b and IEEE 802.11g involve signals that are contained within a 20 MHz wide channel. These 20 MHz channels are within the Industrial Scientific Medical (ISM) band. IEEE 802.11a employs OFDM transmission techniques and provides for data rates of up to 54 Mbps in a 5 GHz band.

Wireless personal area networks (WPANs) are used for exchanging information with devices, such as portable telephones and personal digital assistants (PDAs), that are within the proximity of an individual. Examples of WPAN technologies include Infrared Data Association (IrDA) and Bluetooth.

Bluetooth defines a short-range radio network (also referred to as a piconet). It can be used to create ad hoc networks of up to eight devices, where one device is referred to as a master device and the other devices are referred to as slave devices. The slave devices can communicate with the master device and with each other via the master device. Bluetooth devices are designed to find other Bluetooth devices within their communications range and to discover what services they offer. A typical range for a Bluetooth piconet is 10 meters. However, in certain circumstances, ranges on the order of 100 meters may be attained.

ZigBee is a wireless communications access technology that, like Bluetooth and IEEE 802.11b, operates in the 2.4 GHz (ISM) radio band. Zigbee can connect up to 255 devices per network and provide for data transmission rates of up to 250 Kbps at a range of up to 30 meters. While slower than IEEE 802.11b and Bluetooth, ZigBee devices consume significantly less power.

High rate WPAN schemes are currently under development that employ wireless technologies, such as ultra wideband (UWB) transmission, which provides for the exchange of information at higher data rates. Since gaining approval by the Federal Communications Commission (FCC) in 2002, UWB techniques have become an attractive solution for short-range wireless communications. Current FCC regulations permit UWB transmissions for communications purposes in the frequency band between 3.1 and 10.6 GHz. However, for such transmissions, the average spectral density has to be under −41.3 dBm/MHz and the utilized −10 dBc bandwidth has to be higher than 500 MHz.

There are many UWB transmission techniques that can fulfill these requirements. A common and practical UWB technique is called impulse radio (IR). In IR, data is transmitted by employing short baseband pulses that are separated in time by gaps. Thus, IR does not use a carrier signal. These gaps make IR much more immune to multipath propagation problems than conventional continuous wave radios. RF gating is a particular type of IR in which the impulse is a gated RF pulse. This gated pulse is a sine wave masked in the time domain with a certain pulse shape.

As discussed above, it is desirable for a device to support multiple access technologies. One approach to this is furnishing the device with multiple radios-one for each access technology. However, this approach brings several drawbacks. For instance, every additional radio brings forth an added cost as well as the need for additional physical space on a circuit board (and potentially a dedicated antenna). Moreover, controlling several radios adds complexity to device control. In addition, each separate radio creates a distinct reliability issue. With regard to the development of new devices, the needed effort to design and provide new radios for certain types of links causes delays and additional project risks.

Accordingly, there is a need to support multiple access technologies without furnishing devices with additional radios.

SUMMARY OF THE INVENTION

The present invention provides for a single radio to support multiple types of links, such as WLAN and WPAN links. Such links may have different characteristics, such as bandwidth and power levels. Accordingly, in embodiments of the present invention, a radio supporting multiple link types includes components having adjustable properties.

According to an aspect of the present invention, an apparatus for short-range wireless communications includes a transceiver configured to operate in different modes. Each of these modes corresponds to a particular wireless link type. In addition, the apparatus includes a controller for selectively activating one of the operational modes of the transceiver.

Various wireless link types may be associated with the operational modes. For instance, one link type may be a WLAN link and another link may be a WPAN link. Alternatively, one link type may be a Bluetooth link and another link type may be a WPAN link. Such WPAN links may convey UWB signals.

The transceiver may include a transmitter portion configured to receive one or more operational parameters from the controller. The transmitter portion may include various elements. For instance, the transmitter portion may include a low pass filter having a bandwidth that is determined by one of the one or more operational parameters. Also, the transmitter portion may include a digital to analog converter (DAC) having a sampling rate that is determined by one of the one or more operational parameters. Moreover, the transmitter portion may include a power amplifier that is selectively bypassed based on one of the one or more operational parameters. Alternatively, the power amplifier may have a gain that is determined by one of the one or more operational parameters.

The transceiver may include a receiver portion configured to receive one or more operational parameters from the controller. The receiver portion may include a low pass filter having a bandwidth that is determined by one of the one or more operational parameters. Also, the receiver portion may have an analog to digital converter (ADC) having a sampling rate that is determined by one of the one or more operational parameters.

The controller may set the operational mode of the transceiver according to an event, such as the receipt of a message. In addition, the controller may set the operational mode based on an application.

According to a further aspect of the present invention, a radio for use in a wireless communications device includes a transmitter portion, and a receiver portion. These portions are capable to operate according to different short range wireless communications link types based on one or more received operational parameters.

Further features and advantages will become apparent from the following description and accompanying drawings.

BRIEF DESCRIPTION OF THE DRAWINGS

In the drawings, like reference numbers generally indicate identical, functionally similar, and/or structurally similar elements. The drawing in which an element first appears is indicated by the leftmost digit(s) in the reference number. The present invention will be described with reference to the accompanying drawings, wherein.

DETAILED DESCRIPTION OF THE PREFERRED EMBODIMENTS

I. Operational Environment

Figure 1:
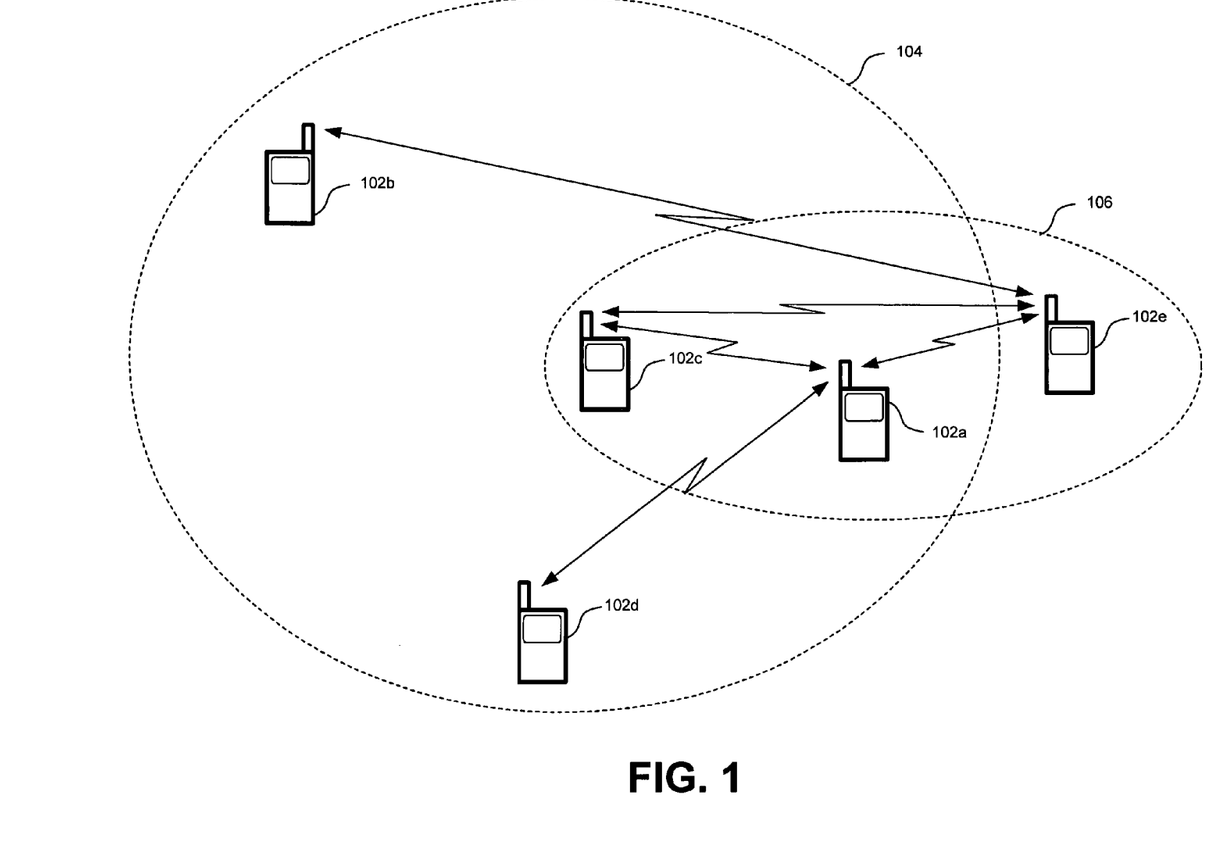
FIG. 1 is a diagram of an operational environment.

FIG. 1 is a diagram of a communications environment according to aspects of the present invention. This environment includes a WLAN 104 and a WPAN 106. Multiple wireless communications devices (WCDs) 102 belong to these networks. In particular, FIG. 1 shows that WCDs 102a, 102b, 102c, and 102d belong to WLAN 104, and WCDs 102a, 102c, and 102e belong to WPAN 106. Thus, WCDs 102a and 102c belong to both WLAN 104 and WPAN 106. WCDs 102 may be various types of devices, such as portable handsets (such as wireless telephones), personal digital assistants (PDAs), personal computers, wireless routers, and access points.

Spectral resources for the networks in FIG. 1 may be allocated in various ways. As an example, resource allocation for WLAN 104 is performed in channels of a fixed bandwidth (e.g., 20 MHz). This fixed channel operation for WLAN 104 provides an operational frequency for each access point in the network, or for each ad-hoc pairing of devices.

In contrast, resource allocation for WPAN 106 is performed according to a spectrum reservation technique, in which wider bandwidth channels (e.g., multiples of 20 MHz) may be reserved. Therefore, WPAN 106 can offer higher symbol rates than the symbol rates offered by WLAN 104.

Spectrum reservation in WPAN 106 may be adaptive. For instance, a certain amount of bandwidth may be reserved according to a device's current data transfer needs. One way of reserving spectrum is in bandwidth increments (or "blocks") that are equal to the channel bandwidths offered by WLAN 104 (e.g., 20 MHz blocks). However, spectrum may be reserved in other ways, such as in blocks that are a fraction of the WLAN 104 channel bandwidth.

Figure 2:
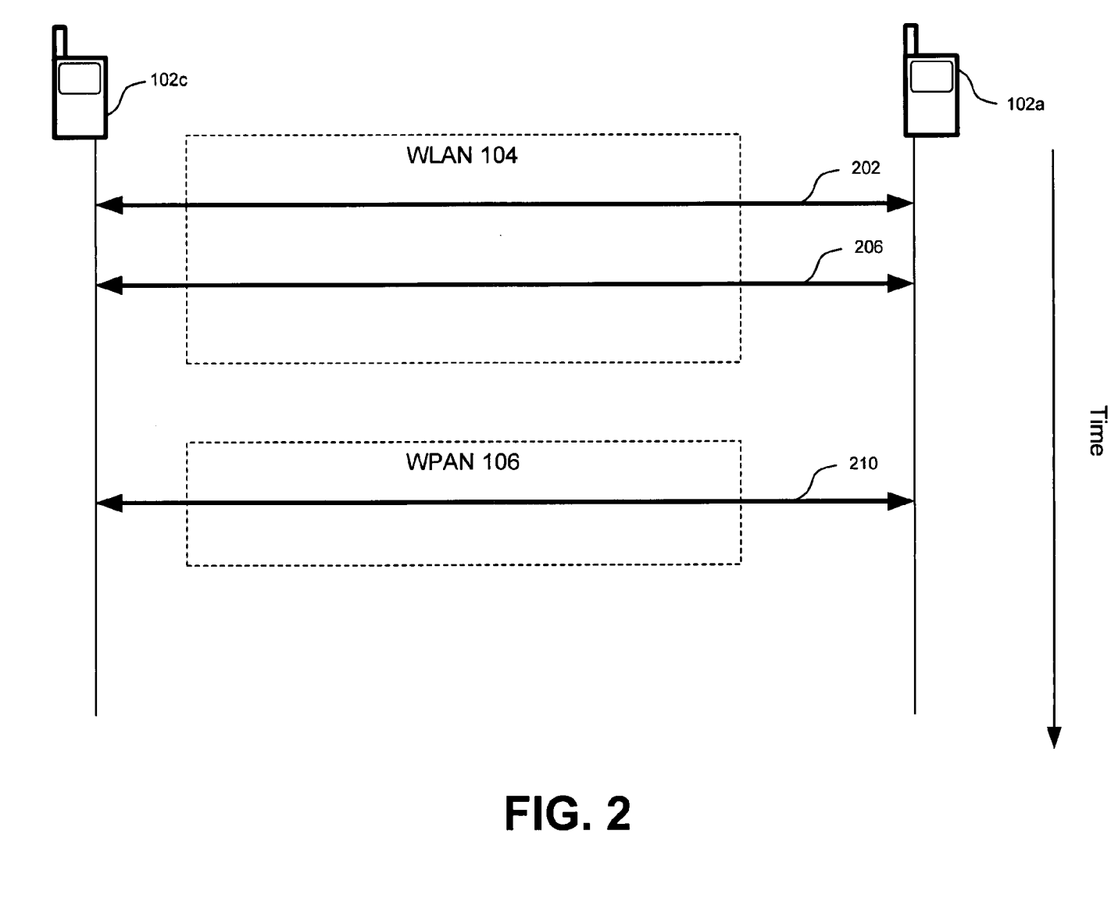
FIG. 2 is a diagram of an operational scenario.

FIG. 2 is a diagram showing an exemplary communications scenario that involves both WLAN 104 and WPAN 106. This scenario involves a sequence of steps. As shown in FIG. 2, this sequence includes a step 202 in which WCD 102a communicates with WCD 102c across WLAN 104. Next, a need for higher rate data transfer arises. Therefore, in a step 206, WCD 102a reserves spectrum in WPAN 106 for communications with WCD 102c.

FIG. 2 shows that this reservation may include communications with WCD 102c across WLAN 104. However, this step may alteratively involve communications with other devices and/or across other networks. After this reservation is complete, a step 210 is performed. In this step, WCD 102a uses the reserved bandwidth of WPAN 106 to communicate with WCD 102c.

The scenario of FIG. 2 is described with reference to the environment of FIG. 1, in which WPAN 106 is shown as a preexisting network. However, scenarios may involve devices, such as WCD 102a, setting up (or establishing) a wireless personal area network to fulfill its data transfer requirements. Accordingly, the sequence of FIG. 2 may include an optional step in which WCD 102a establishes WPAN 106.

Embodiments of the present invention provide a single radio for use in a wireless communications device. This radio is capable of supporting different link types for accessing multiple kinds of networks (such as WLANs and WPANs). For example, in embodiments, a single radio may handle IEEE 802.11a/b/g WLAN communications as well as high rate WPAN communications. This feature advantageously avoids burdening devices, such as portable handsets, with multiple radios.

Typically, high rate WPAN usage is sporadic since it used for specific applications (e.g. file transfer). Therefore, WLAN operation can be paused during times that high rate WPAN functionality is used without introducing a significant interruption to WLAN usage.

II. Radio Portions

Wireless communications devices, such as WCDs 102, include components enabling them to transmit and receive wireless signals. These components include transmitter and receiver portions that may be included in a radio or a transceiver. Examples of such portions are described herein with reference to FIGS. 3-6.

Figure 3:
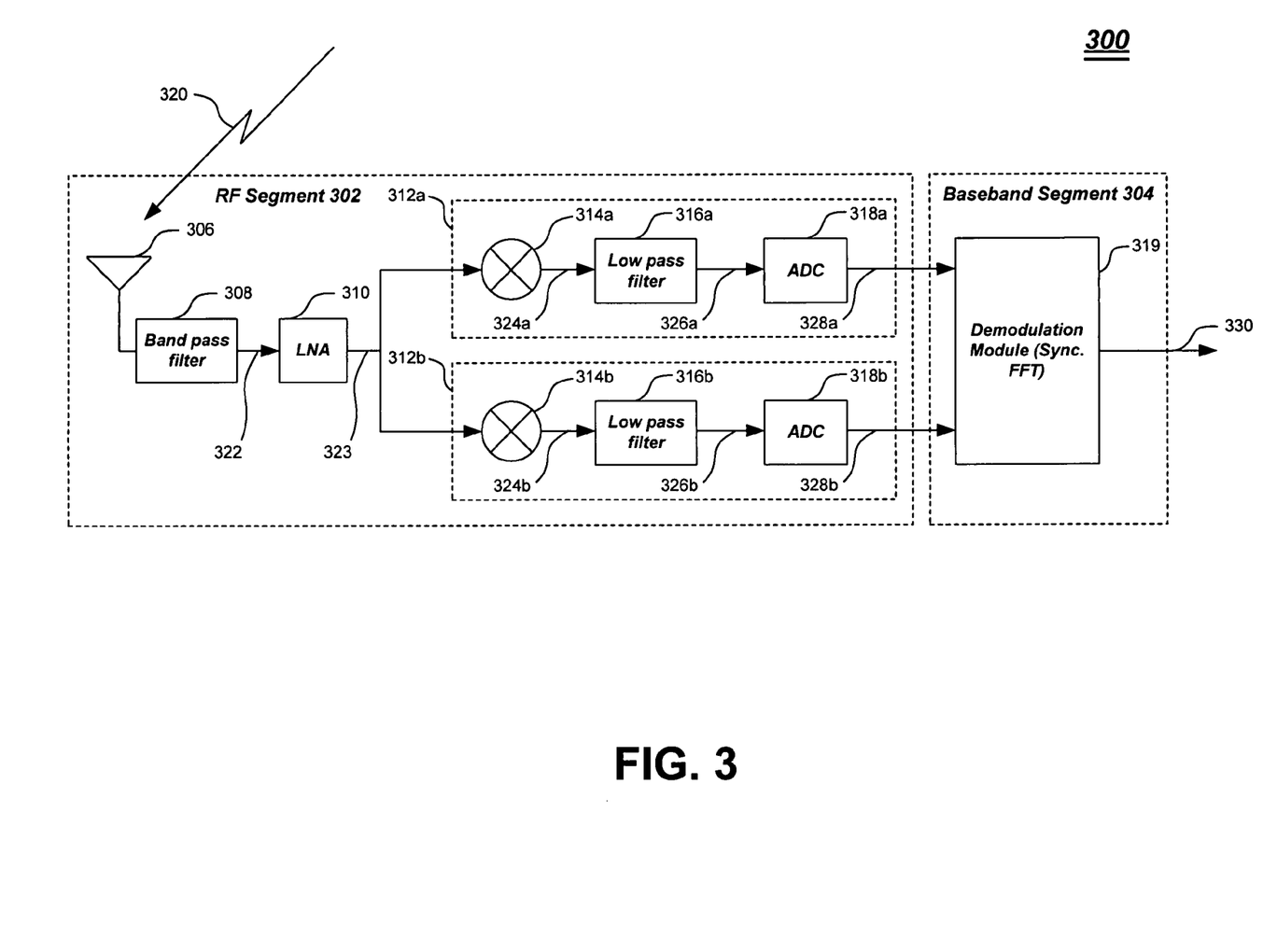
FIG. 3 is diagram of a conventional receiver portion of a radio.

FIG. 3 is a block diagram of an exemplary receiver portion 300 that may be used by a device to receive, for example, WLAN (i.e., IEEE 802.11) or Bluetooth signals. Receiver portion 300 includes an RF segment 302 and a baseband segment 304. RF segment 302 includes an antenna 306, a band pass filter 308, and a low noise amplifier (LNA) 310. In addition, RF segment 302 includes an in-phase (I) processing path 312a and a quadrature (Q) processing path 312b.

As shown in FIG. 3, antenna 306 receives a wireless transmission 320 and passes it to band pass filter 308. In turn, band pass filter 310 produces from this transmission a filtered RF signal 322. Signal 322 is sent to LNA 310, which produces from it an amplified RF signal 323. Amplified RF signal 323 is sent to processing paths 312 for downconversion. As shown in FIG. 3, each processing path 312 includes a mixer 314, a low pass filter 316, and an analog to digital converter (ADC) 318.

Mixers 314 receive RF signal 323 from LNA 310. Each mixer 314 is driven by a corresponding oscillator signal (not shown). These oscillator signals may be substantially sinusoidal and tuned to a frequency channel or band in which the reception of signals is desired. The oscillator signal that drives mixer 314a and the oscillator signal that drives mixer 314b are ninety degrees (90°) out-of-phase with each other.

As a result of such tuning, mixers 314 produce downconverted signals 324a and 324b. FIG. 3 shows that signals 324a and 324b are sent to low pass filters 316a and 316b, respectively. Low pass filters 316 (also referred to herein as channel filters) have a bandwidth that corresponds to the bandwidth of an employed communications channel. Accordingly, filters 316 remove energy from signals 324 that is outside of this bandwidth. For Bluetooth implementations, an exemplary bandwidth is 1 MHz. For WLAN implementations, an exemplary bandwidth is 20 MHz. However, other bandwidths may be employed.

Thus, filters 316 generate filtered signals 326, which are sent to ADCs 318. ADCs 318 convert filtered signals 326 (which are analog) into digitally encoded representations. These representations are shown in FIG. 3 as an in-phase digital signal 328a and a quadrature digital signal 328b.

To derive information from digital signals 328, baseband segment 304 includes a demodulation module 319. Demodulation module 319 may be controlled according to the type of link being employed. FIG. 3 shows that demodulation module 319 receives digital signals 328a and 328b and demodulates them according to a suitable modulation scheme, such as frequency shift keying (FSK) or OFDM. For instance, FIG. 3 shows demodulation module 319 as an OFDM demodulator, which performs fast fourier transforms (FFTs) on signals 328.

As a result of these demodulation operations, demodulation module 319 produces a data stream 330, which may be sent to higher layer entities (not shown). Examples of higher layer entities include media access controllers (MACs), link controllers and/or user applications.

Figure 4:
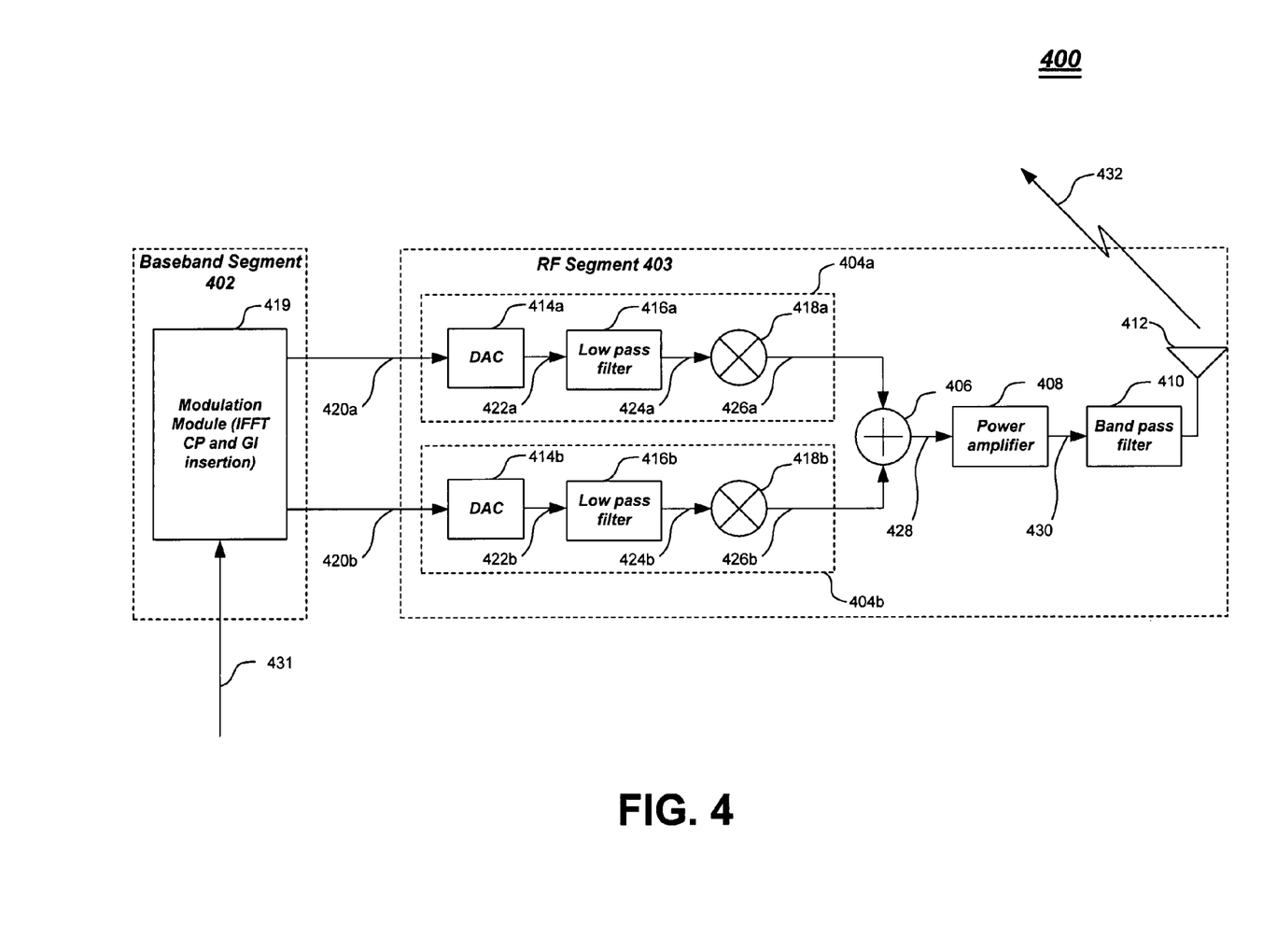
FIG. 4 is a diagram of a conventional transmitter portion of a radio.

FIG. 4 is a block diagram of an exemplary transmitter portion 400 that may be used by a device to transmit, for example, WLAN or Bluetooth signals. Transmitter portion 400 includes a baseband segment 402, and an RF segment 403. As shown in FIG. 4, RF segment 403 includes an in-phase (I) processing path 404a, a quadrature (Q) processing path 404b, a combining node 406, a power amplifier 408, a band pass filter 410, and an antenna 412.

Baseband segment 402 includes a modulation module 419. This module may be controlled based on the type of link being employed. FIG. 4 shows that modulation module 419 generates digital signals 420a and 420b from a data stream 431. Data stream 430 is received from higher layer entities (not shown), such as MACs, link controllers and/or user applications. Signals 420a and 420b are modulated according to a modulation scheme, such as FSK or OFDM. For instance, FIG. 4 illustrates modulation module 419 employing OFDM by computing inverse fast fourier transforms (IFFT) and inserting cyclic prefixes (CPs) and guard intervals (GIs).

Signals 420 are sent to processing paths 404 for upconversion. As shown in FIG. 4, each processing path 404 includes a digital to analog converter (DAC) 414, a low pass filter 416, and a mixer 418. Each DAC 414 receives a respective one of signals 420. Upon receipt, DACs 414 convert signals 420 (which are digital) into analog representations. These representations are shown in FIG. 4 as signals 422a and 422b.

FIG. 4 shows that signals 422a and 422b are sent to low pass filters 416a and 416b, respectively. Low pass filters 416 (also referred to herein as channel filters) have a bandwidth, which corresponds to the bandwidth of an employed communications channel. Accordingly, filters 416 remove energy from signals 422 that is outside of this bandwidth. As described above, an exemplary bandwidth for Bluetooth implementations is 1 MHz, and an exemplary bandwidth for WLAN implementations is 20 MHz. However, other bandwidths may be employed.

Filters 416 produce signals 424a and 424b, which are sent to mixers 418a and 418b, respectively. Each mixer 418 is driven by a corresponding oscillator signal (not shown). These oscillator signals may be substantially sinusoidal and tuned to a frequency channel or band in which transmission is desired. The oscillator signal that drives mixer 418a and the oscillator signal that drives mixer 418b are ninety degrees (90°) out-of-phase with each other.

Figure 5:
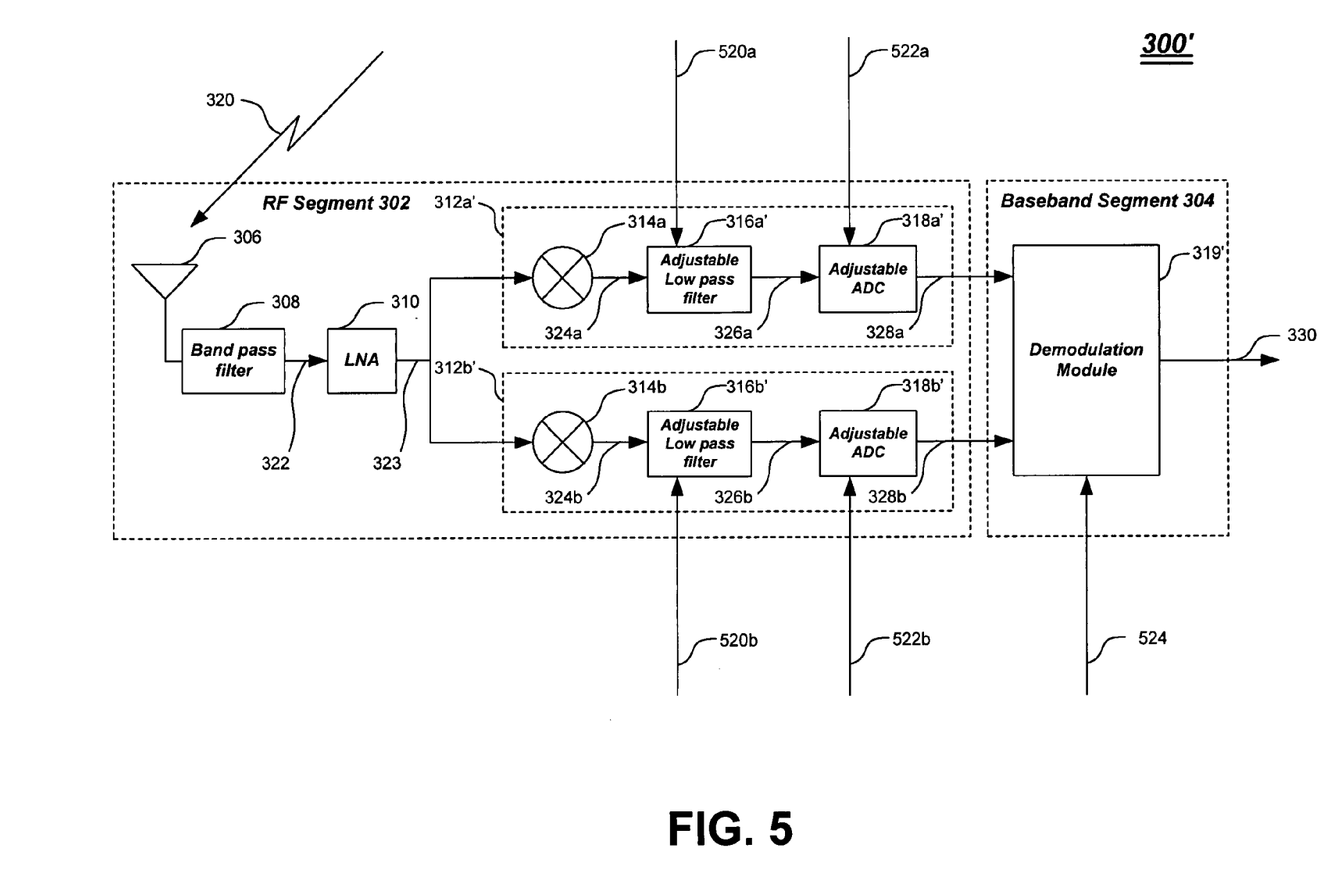
FIG. 5 is diagram of an adaptable receiver portion of a radio, according to an embodiment of the present invention.

FIG. 4 shows that mixers 418 produce upconverted signals 426a and 426b, which are sent to combining node 406. Node 406 combines (e.g., sums) signals 426a and 426b to produce a signal 428. To prepare this signal for transmission, it is amplified by power amplifier 408. This produces an amplified signal 430, which is filtered by band pass filter 410. In embodiments, band pass filter 410 is tuned to the desired transmission channel's center frequency and has a bandwidth that covers the transmission channel's bandwidth. As shown in FIG. 5, band pass filter 410 produces a filtered signal 432, which is transmitted by antenna 412.

As described above, the present invention provides for a single radio to support multiple types of links, such as WLAN and WPAN links. The supported link types may have different characteristics. For instance, a supported WPAN link may have a symbol rate that is higher than a supported WLAN link's symbol rate. This means that the baseband signal of the WPAN link will have a wider bandwidth.

To support such bandwidth variations, attributes of various radio components, such as transmitter and receiver portions, need to be flexible. For instance, ADCs and DACs may need multiple symbol rate and/or multiple resolution capabilities. In addition, filters (such as low pass filters and/or band pass filters) may need to provide passbands having a variety of available bandwidths. Such flexibilities may offer further advantages. For example, ADCs and/or DACs having scaled-down resolutions may advantageously conserve a device's power consumption.

In addition to requiring different symbol rates and bandwidths, different link types may require different transmission power levels. For instance, links having wider bandwidths may require lower transmit power levels than narrower bandwidth links. Alternatively, for some links, it may be desirable to limit transmit power to reduce the device's power consumption. As an example, the transmit power levels required for WPAN operation may be significantly lower than the transmit power levels required for WLAN operation. Accordingly, depending on the link type being employed, a radio's power amplifier(s) may be adjustable (or even bypassed entirely) to achieve the appropriate transmit power levels.

Figure 6:
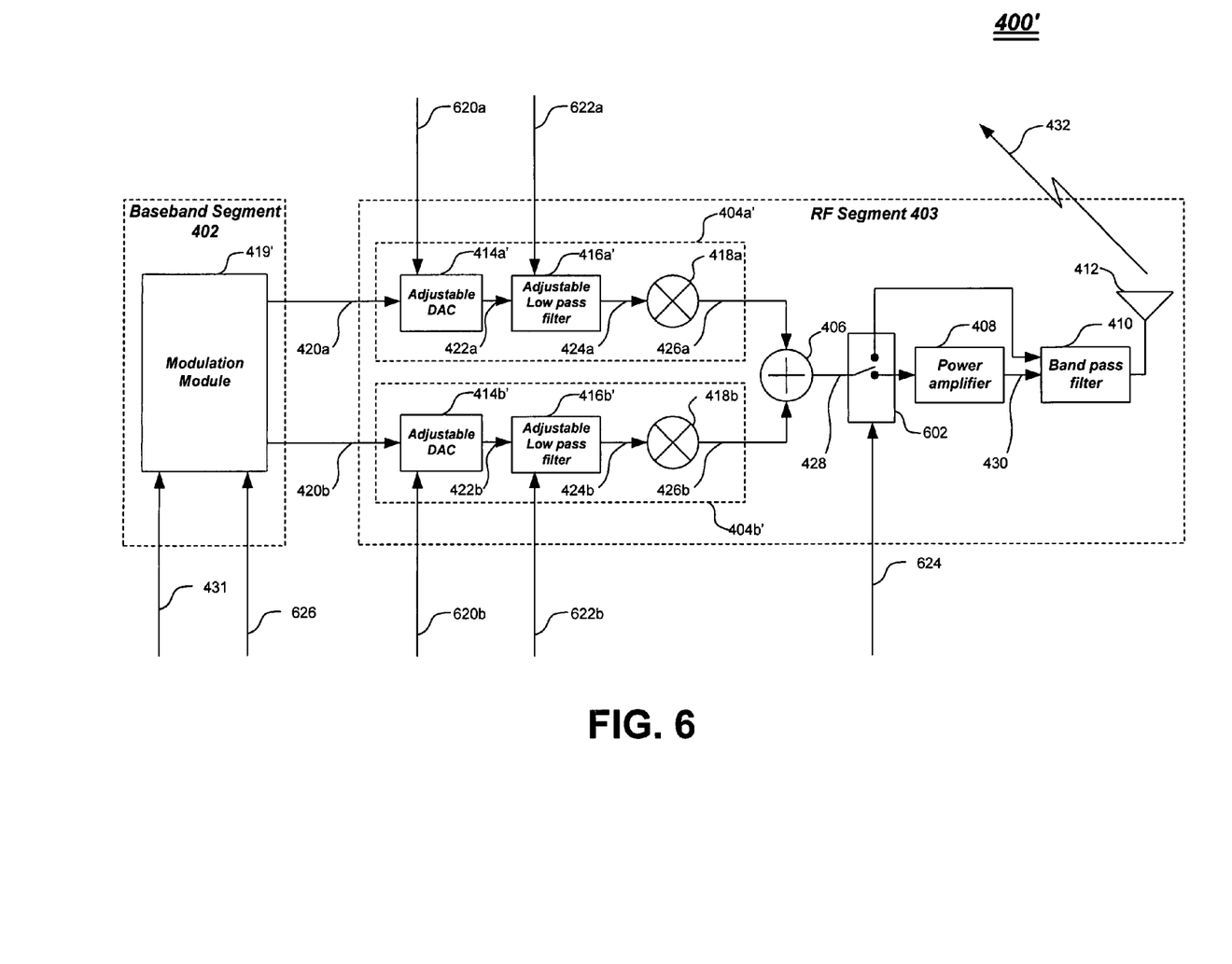
FIG. 6 is diagram of an adaptable transmitter portion of a radio, according to an embodiment of the present invention.

FIGS. 5 and 6 provide examples of transmitter and receiver portions, according to embodiments of the present invention. These examples are similar to the transmitter and receiver portions shown in FIGS. 3 and 4. However, the examples of FIGS. 5 and 6 provide flexible operating characteristics.

FIG. 5 is a diagram of a receiver portion 300', which is similar to receiver portion 300 of FIG. 3. However, receiver portion 300' includes various adjustable components. In particular, receiver portion 300' includes processing paths 312a' and 312b'. Each of these processing paths includes an adjustable low pass filter 316' and an adjustable ADC 318'. Also, receiver portion 300' includes a demodulation module 319' that may be adjusted to perform demodulation operations that are suitable for the employed link. For example, the modulation type and/or coding parameters may be adjusted based on the employed link.

Adjustable low pass filters 316' each have a bandwidth that is determined by a corresponding control signal 520. Each adjustable ADC 318' has a sampling rate and a resolution that are determined by a corresponding control signal 522. The demodulation operations performed by demodulation module 319' are determined by a control signal 524. Signals 520, 522, and 524 may be received from a radio controller (not shown). An example of such a radio controller is described below with reference to FIG. 7.

FIG. 6 is a diagram of a transmitter portion 400', which is similar to transmitter portion 400 of FIG. 4. However, receiver portion 400' includes various adjustable components. These adjustable components include processing paths 404a' and 404b'. As shown in FIG. 4, each of these processing paths includes an adjustable DAC 414' and an adjustable low pass filter 416'. In addition, transmitter portion 400' includes an adjustable modulation module 419'.

Adjustable DACs 414' each have a sampling rate and resolution that are determined by a corresponding control signal 620. Adjustable low pass filters 416' each have a bandwidth that is determined by a corresponding control signal 622. In addition to these adjustable components, transmitter portion 400' includes a switching module 602. Switching module 602 allows power amplifier 408 to be bypassed based on a control signal 624.

Modulation module 419' may be adjusted to perform modulation operations that are suitable for the employed link. For example, the modulation type and/or coding parameters may be adjusted based on the employed link. These operations are determined by a control signal 626. Control signals 620, 622, 624, and 626 may be received from a radio controller (not shown) such as the radio controller described below with reference to FIG. 7.

In an alternative implementation, switching module 602 is not present. Instead, power amplifier 408 is a variable gain amplifier, that is controlled by a gain control signal (not shown). This control signal may also be received from a radio controller, such as the one described below with reference to FIG. 7.

III. Wireless Communications Device

Figure 7:
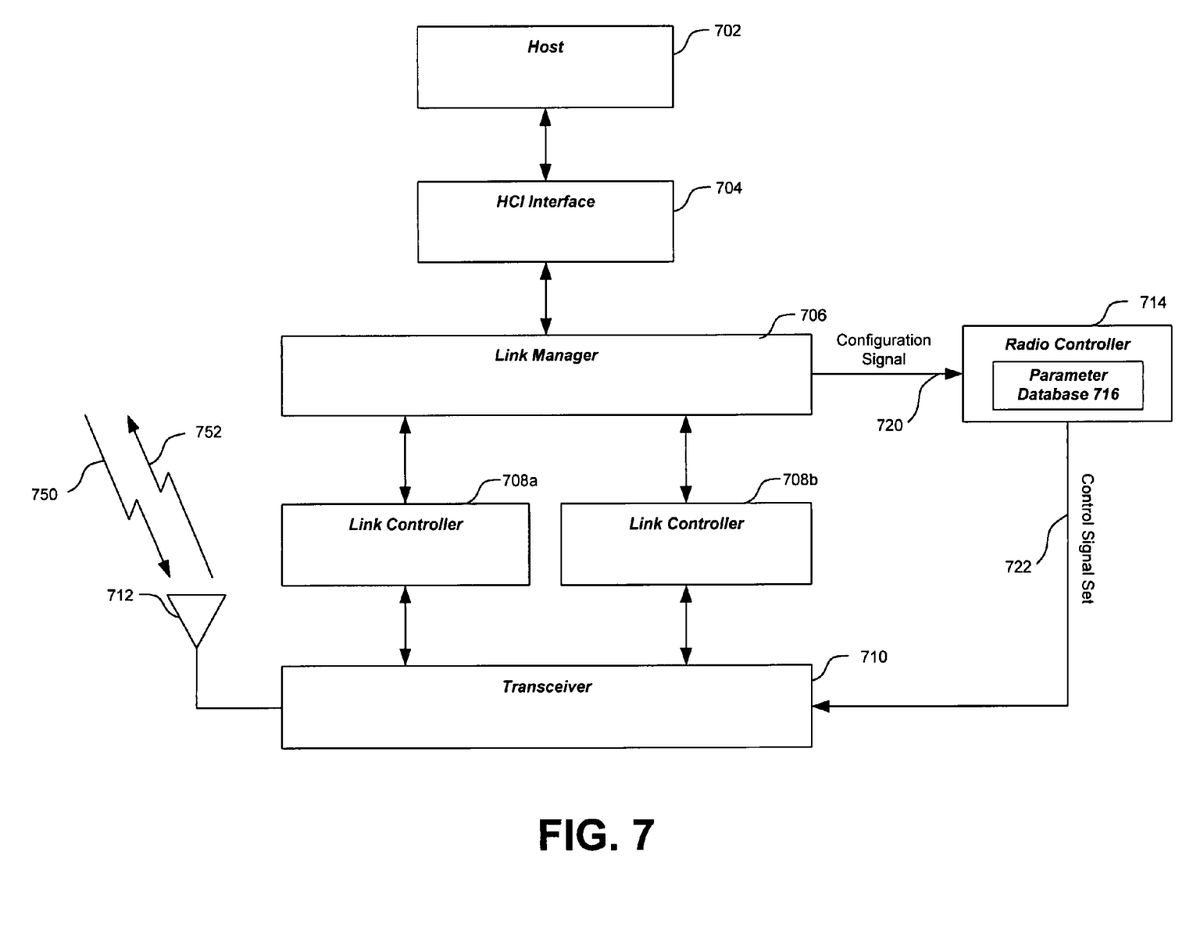
FIG. 7 is a block diagram of a wireless communications device architecture.

FIG. 7 is a block diagram showing a wireless communications device architecture, which may be used for wireless communications devices (such as devices 102), in embodiments of the present invention. This architecture may be used to support wireless communications across multiple link types.

The device architecture of FIG. 7 includes a host 702, a host controller interface (HCI) 704, a link manager 706, multiple link controllers 708, a transceiver (or radio) 710, and an antenna 712. In addition, the architecture of FIG. 7 includes a radio controller 714.

Host 702 is responsible for functions involving user applications and higher protocol layers. Therefore, host 702 may include various applications. Such an application may require information to be transmitted across different types of links. For instance, host 702 may include a browser application that requires a lower data rate link for the reception of typical content, but a higher data rate link for the reception of certain objects such as images, video content, and files.

Link manager 706 performs functions related to link setup, security and control. These functions involve discovering corresponding link managers at remote devices and communicating with them according to the link manager protocol (LMP). More particularly, link manager 706 exchanges LMP protocol data units (PDUs) with link managers at remote devices.

Link manager 706 exchanges information with host 702 across HCI 704. This information may include commands received from host 702, and information transmitted to host 702. Examples of such commands may include directives from host 702 to employ a certain link type.

The device architecture of FIG. 7 includes multiple link controllers 708. In particular, FIG. 7 shows a first link controller 708a and a second link controller 708b. Each link controller 708 operates as an intermediary between link manager 706 and transceiver 710 for a particular type of link. For example, link controller 708a may operate as an intermediary for a WLAN link, while link controller 710b may operate as an intermediary for a higher data rate WPAN link.

Each link controller 708 performs baseband processing for transmissions according to its corresponding link type. Such processing may include error correction encoding and decoding. In addition, when operating, each link controller 708 exchanges data with corresponding link controllers at remote devices according to physical layer protocols. Examples of such physical layer protocols include retransmission protocols such as the automatic repeat request (ARQ) protocol.

Transceivers 710 are coupled to antenna 712. Transceiver 710 includes components that allow (in conjunction with antenna 712) the exchange of wireless signals with remote devices. Such components include modulators, demodulators, amplifiers, and filters. Transceiver 710 may support various wireless link types. Therefore, transceiver may include configurable receiver and transmitter portions such as the ones of FIGS. 5 and 6.

Radio controller 714 is coupled between link manager 706 and transceiver 710. As shown In FIG. 7, a configuration signal 720 is sent from link manager 706 to controller 714. Based on signal 720, controller 714 generates a control signal set 722. Control signal set 722 includes one or more control signals that establish operational characteristics of transceiver 710. For example, as described above with reference to FIGS. 5 and 6, control signal set 722 may include signals 520, 522, 524, 620, 622, 624, and 626.

As shown in FIG. 7, radio controller may include a parameter database 716 that includes multiple parameter sets for various communications or access technologies. An exemplary parameter database 716 may include parameter sets for technologies such as different WLAN standards (e.g., different standards or extensions with the IEEE 802.11 family), Bluetooth, ZigBee, and high rate WPAN technologies such as UWB.

Figure 8:
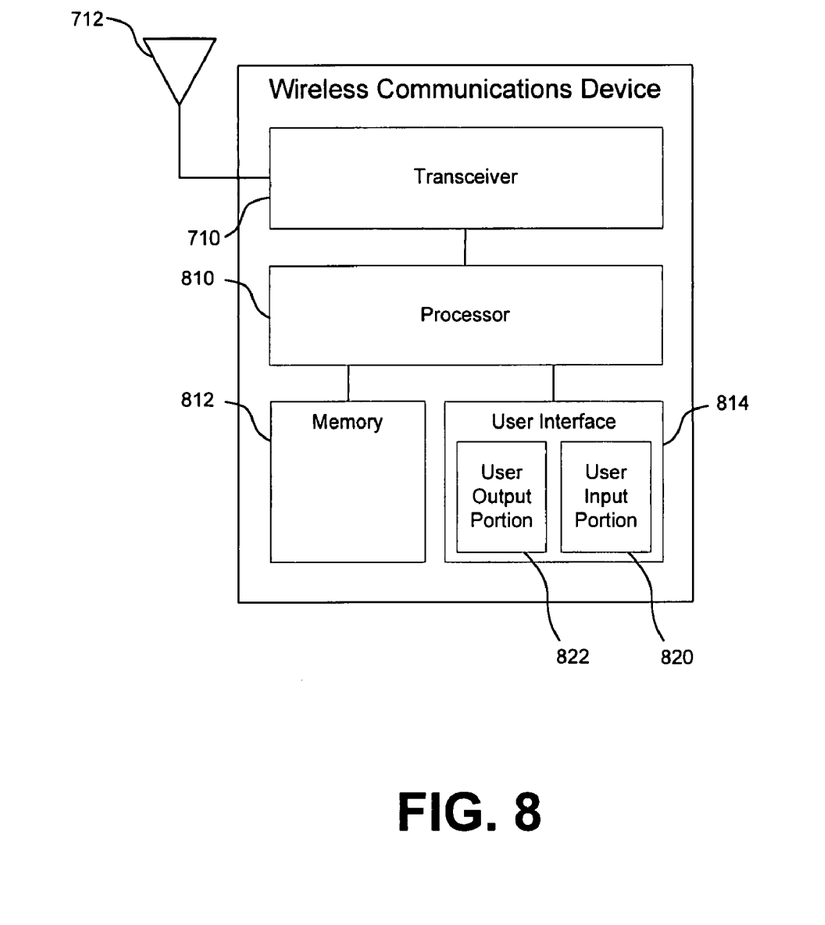
FIG. 8 is a block diagram of a wireless communications device implementation.

Device architectures, such as the architecture of FIG. 7, may be implemented in hardware, software, firmware, or any combination thereof. One such implementation is shown in FIG. 8. This implementation includes a processor 810, a memory 812, a user interface 814. In addition, the implementation of FIG. 8 includes transceiver 710 and antenna 712.

Processor 810 controls device operation. As shown in FIG. 8, processor 810 is coupled to transceiver 710. Processor 810 may be implemented with one or more microprocessors that are each capable of executing software instructions stored in memory 812.

Memory 812 includes random access memory (RAM), read only memory (ROM), and/or flash memory, and stores information in the form of data and software components (also referred to herein as modules). The data stored by memory 812 may be associated with particular software components.

The software components stored by non-transitory memory 812 include instructions (also referred to as computer program logic) that can be executed by processor 810. Various types of software components may be stored in memory 812. For instance, memory 812 may store software components that control the operation of transceiver 710. Also, memory 812 may store software components that provide for the functionality of host 702, HCI 704, link manager 706, link controllers 708, and radio controller 714.

As shown in FIG. 8, user interface 814 is also coupled to processor 810. User interface 814 facilitates the exchange of information with a user. FIG. 8 shows that user interface 814 includes a user input portion 820 and a user output portion 822. User input portion 820 may include one or more components that allow a user to input information. Examples of such components include keypads, touch screens, and microphones. User output portion 822 allows a user to receive information from the device. Thus, user output portion 822 may include various components, such as a display, and one or more audio speakers. Exemplary displays include liquid crystal displays (LCDs), and video displays.

The elements shown in FIG. 8 may be coupled according to various techniques. One such technique involves coupling transceiver 710, processor 810, memory 812, and user interface 814 through one or more bus interfaces. In addition, each of these components is coupled to a power source, such as a removable and/or rechargeable battery pack (not shown).

IV. Operation

Figure 9:
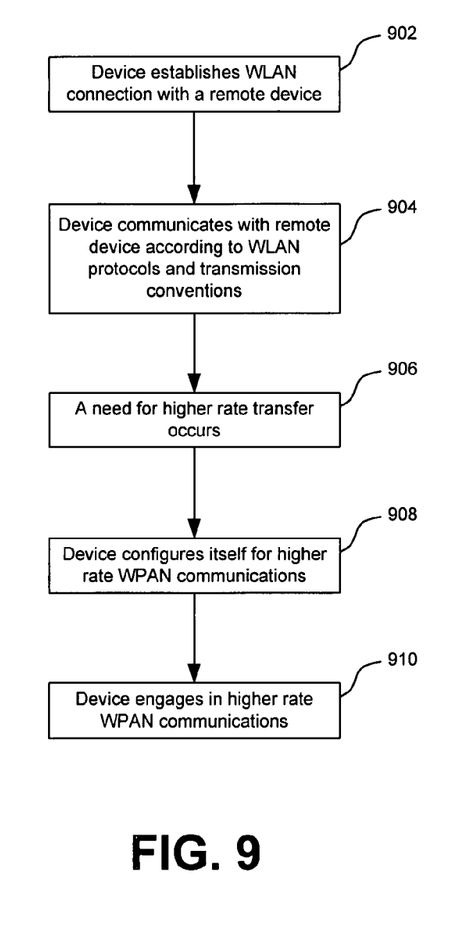
FIG. 9 is a flowchart illustrating a performance of a wireless communications device.

In embodiments of the present invention, reconfiguration of radios may be based on various factors or events. FIG. 9 is a flowchart of an exemplary operational scenario of a device having a transmitting and receiving portions with flexible operating characteristics, such as the portions of FIGS. 5 and 6. Operation of this device is described with reference to the architecture of FIG. 7. However, other architectures may be employed.

In a step 902, device establishes a WLAN connection with a remote device, such as router. In a step 904, the device communicates with the remote device according to WLAN protocols and transmission conventions. Accordingly, with reference to FIG. 7, the device is employing a link controller 708 that corresponds to WLAN communications. In addition, radio controller 714 is providing (or has provided) transceiver 710 with a set of parameters in control signal set 722 that enables it to transmit and receive WLAN signals.

In a step 906 a need for higher rate data transfer arises. This need may arise, for example, for the device's user selecting a large file for downloading. Therefore, in a step 908 the device configures itself for high rate WPAN (e.g., UWB) communications. Step 908 may include link manager 706 issuing a configuration signal 720 that specifies the employment of high rate WPAN (e.g., UWB) communications. In embodiments, configuration signal 720 is initiated by directives from higher layer processes (e.g., user applications) within host 702. These directives are sent across HCI 704 to link manager 706.

Step 908 may also include, in response to signal 720, radio controller 714 issuing a control signal set 722 having a set of parameters that enables the device to perform such high rate WPAN communications. Next, in a step 910, the device engages high rate WPAN communications.

The sequence of FIG. 9 is provided merely as an example. Therefore, other sequences are within the scope of the present invention. For instance, sequences involving other access technologies, such as Bluetooth and Zigbee, may be employed. Moreover, sequences involving several transitions between two or more access technologies may also be employed.

Also, FIG. 9 shows in step 906 and 908 radio reconfiguration being performed in response to an application. However, in embodiments, this radio reconfiguration may be based on a sensed event, such as the receipt of certain information (e.g., a special message) received by the device across the network it is currently using. This message may contain parameters and other network information (e.g., addresses) to cause the device to reconfigure its radio and communicate accordingly, V. Conclusion While various embodiments of the present invention have been described above, it should be understood that they have been presented by way of example only, and not in limitation. For instance, although examples have been described involving Bluetooth, IEEE 802.11, UWB, and IEEE 802.15.3a technologies, other short-range and longer range communications technologies are within the scope of the present invention.

Accordingly, it will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. An apparatus, comprising:
   a single transceiver configured to operate in a first operational mode corresponding to a first wireless link type, and a second operational mode corresponding to a second wireless link type based on operational parameters of the transceiver, the transceiver receiving a wireless message across a wireless network in the first wireless link type, for reservation of spectrum in the second wireless link type to increase data transfer rate, the message containing information indicating a particular configuration of the transceiver corresponding to the second wireless link type; and a controller coupled to the transceiver, configured to selectively activate one of the first and second operational modes of the transceiver by changing the operational parameters of the transceiver to adjust characteristics of the transceiver according to one of the first and second operational modes, by setting the operational mode of the transceiver based on the information in the wireless message;

said transceiver including a transmitter portion configured to receive one or more operational parameters from the controller, the transmitter portion including a digital to analog converter having a sampling rate that is determined by one of the one or more operational parameters, said transceiver further including a receiver portion configured to receive one or more operational parameters from the controller, the receiver portion including an analog to digital converter having a sampling rate that is determined by one of the one or more operational parameters;

wherein the first and second operational modes operate at a different data rate.

2. The apparatus of claim 1, wherein the first wireless link type is a wireless local area network link and the second wireless link type is a wireless personal area network link.

3. The apparatus of claim 2, wherein the second wireless link type conveys ultra wideband signals.

4. The apparatus of claim 1, wherein the first wireless link type is a Bluetooth link and the second wireless link type is a wireless personal area network link that conveys ultra wideband signals.

5. The apparatus of claim 1, wherein the transmitter portion includes a low pass filter having a bandwidth that is determined by one of the one or more operational parameters.

6. The apparatus of claim 1, wherein the transmitter portion includes a digital to analog converter having a resolution that is determined by one of the one or more operational parameters.

7. The apparatus of claim 1, wherein the transmitter portion includes a power amplifier, that is selectively bypassed based on one of the one or more operational parameters.

8. The apparatus of claim 1, wherein the transmitter portion includes a power amplifier having a gain that is determined by one of the one or more operational parameters.

9. The apparatus of claim 1, wherein the receiver portion includes a low pass filter having a bandwidth that is determined by one of the one or more operational parameters.

10. The apparatus of claim 1, wherein the receiver portion includes an analog to digital converter having a resolution that is determined by one of the one or more operational parameters.

11. The apparatus of claim 1, wherein the first wireless link type has a data rate that is smaller than a data rate of the second wireless link type.

12. The apparatus of claim 1, wherein the first wireless link type has a bandwidth that is smaller than a bandwidth of the second wireless link type.

13. The apparatus of claim 1, wherein the controller sets the operational mode of the transceiver according to an event.

14. The apparatus of claim 1, wherein the event includes receipt of a message indicating a particular configuration of the transceiver.

15. The apparatus of claim 1, wherein the controller sets the operational mode of the transceiver according to an application.

16. A radio, comprising:
a single transmitter portion;
a single receiver portion; and
a controller coupled to the transmitter and receiver;
wherein the transmitter and receiver portions are capable to operate according to different wireless communications link types based on one or more operational parameters provided by the controller, by setting the operational mode of the transmitter and receiver portions based on receiving a wireless message in a first wireless link type, for reservation of spectrum in a second wireless link type to increase data transfer rate, the message containing information indicating a particular configuration of the transmitter and receiver portions corresponding to a particular wireless link type;

said transmitter portion configured to receive one or more operational parameters from the controller based on the information received in the wireless message, the transmitter including a digital to analog converter having a sampling rate that is determined by one of the one or more operational parameters corresponding to the particular wireless link type, said receiver portion configured to receive one or more operational parameters from the controller based on the information received in the wireless message, the receiver including an analog to digital converter having a sampling rate that is determined by one of the one or more operational parameters corresponding to the particular wireless link type.

17. The radio of claim 16, wherein the transmitter portion includes a low pass filter having a bandwidth that is determined by one of the one or more operational parameters.

18. The radio of claim 16, wherein the transmitter portion includes a digital to analog converter having a resolution that is determined by one of the one or more operational parameters.

19. The radio of claim 16, wherein the transmitter portion includes a power amplifier, wherein the power amplifier is selectively bypassed based on one of the one or more operational parameters.

20. The radio of claim 16, wherein the transmitter portion includes a power amplifier having a gain that is determined by one of the one or more operational parameters.

21. The radio of claim 16, wherein the receiver portion includes a low pass filter having a bandwidth that is determined by one of the one or more operational parameters.

22. The radio of claim 16, wherein the receiver portion includes an analog to digital converter having a resolution that is determined by one of the one or more operational parameters.

23. A method, comprising:
configuring a transceiver in a wireless device in a first operational mode corresponding to a first wireless link type, and a second operational mode corresponding to a second wireless link type based on operational parameters of the transceiver, the transceiver receiving a wireless message across a wireless network in the first wireless link type, for reservation of spectrum in the second wireless link type to increase data transfer rate, the message containing information indicating a particular configuration of the transceiver corresponding to the second wireless link type; and selectively activating one of the first and second operational modes of the transceiver by changing the operational parameters of the transceiver to adjust characteristics of the transceiver according to one of the first and second operational modes, by setting the operational mode of the transceiver based on the information in the wireless message;

said transceiver including a transmitter portion configured to receive one or more operational parameters from a controller, the transmitter portion including a digital to analog converter having a sampling rate that is determined by one of the one or more operational parameters, said transceiver further including a receiver portion configured to receive one or more operational parameters from the controller, the receiver portion including an analog to digital converter having a sampling rate that is determined by one of the one or more operational parameters;

wherein the first and second operational modes operate at a different data rate.

24. A non-transitory computer readable memory containing computer program instructions recorded thereon for execution in a processor, the computer program instructions, comprising:

program instructions in said computer readable memory for configuring a transceiver in a wireless device in a first operational mode corresponding to a first wireless link type, and a second operational mode corresponding to a second wireless link type based on operational parameters of the transceiver, the transceiver receiving a wireless message across a wireless network in the first wireless link type, for reservation of spectrum in the second wireless link type to increase data transfer rate, the message containing information indicating a particular configuration of the transceiver corresponding to the second wireless link type; and program instructions in said computer readable memory for selectively activating one of the first and second operational modes of the transceiver by changing the operational parameters of the transceiver to adjust characteristics of the transceiver according to one of the first and second operational modes, by setting the operational mode of the transceiver based on the information in the wireless message;

said transceiver including a transmitter portion configured to receive one or more operational parameters from a controller, the transmitter portion including a digital to analog converter having a sampling rate that is determined by one of the one or more operational parameters, said transceiver further including a receiver portion configured to receive one or more operational parameters from the controller, the receiver portion including an analog to digital converter having a sampling rate that is determined by one of the one or more operational parameters;

wherein the first and second operational modes operate at a different data rate.

25. An apparatus, comprising:

a single transmitter configured to operate in a first operational mode corresponding to a first wireless link type, and a second operational mode corresponding to a second wireless link type based on operational parameters of the transmitter, the apparatus receiving a wireless message across a wireless network in the first wireless link type, for reservation of spectrum in the second wireless link type to increase data transfer rate, the message containing information indicating a particular configuration of the transmitter corresponding to the second wireless link type; and a controller coupled to the transmitter, configured to selectively activate one of the first and second operational modes of the transmitter by changing the operational parameters of the transmitter to adjust characteristics of the transmitter according to one of the first and second operational modes, by setting the operational mode of the transmitter based on the information in the wireless message;

said transmitter configured to receive one or more operational parameters from the controller, the transmitter including a digital to analog converter having a sampling rate that is determined by one of the one or more operational parameters, wherein the first and second operational modes operate at a different data rate.

26. The apparatus of claim 25, wherein the transmitter includes a low pass filter having a bandwidth that is determined by one of the one or more operational parameters.

27. The apparatus of claim 25, wherein the transmitter includes a digital to analog converter having a resolution that is determined by one of the one or more operational parameters.

28. The apparatus of claim 25, wherein the transmitter portion includes a power amplifier, that is selectively bypassed based on one of the one or more operational parameters.

29. The apparatus of claim 25, wherein the transmitter includes a power amplifier having a gain that is determined by one of the one or more operational parameters.

30. An apparatus, comprising:

a single receiver configured to operate in a first operational mode corresponding to a first wireless link type, and a second operational mode corresponding to a second wireless link type based on operational parameters of the receiver, the receiver receiving a wireless message across a wireless network in the first wireless link type, for reservation of spectrum in the second wireless link type to increase data transfer rate, the message containing information indicating a particular configuration of the receiver corresponding to the second wireless link type; and a controller coupled to the receiver, configured to selectively activate one of the first and second operational modes of the receiver by changing the operational parameters of the receiver to adjust characteristics of the receiver according to one of the first and second operational modes, by setting the operational mode of the receiver based on the information in the wireless message;

said receiver configured to receive one or more operational parameters from the controller, the receiver including an analog to digital converter having a sampling rate that is determined by one of the one or more operational parameters;

wherein the first and second operational modes operate at a different data rate.

31. The apparatus of claim 30, wherein the receiver includes a low pass filter having a bandwidth that is determined by one of the one or more operational parameters.

32. The apparatus of claim 30, wherein the receiver includes an analog to digital converter having a resolution that is determined by one of the one or more operational parameters.

33. An apparatus, comprising:

means for configuring a single transceiver in a wireless device in a first operational mode corresponding to a first wireless link type, and a second operational mode corresponding to a second wireless link type based on operational parameters of the transceiver, the transceiver receiving a wireless message across a wireless network in the first wireless link type, for reservation of spectrum in the second wireless link type to increase data transfer rate, the message containing information indicating a particular configuration of the transceiver corresponding to the second wireless link type; and means for selectively activating one of the first and second operational modes of the transceiver by changing the operational parameters of the transceiver to adjust characteristics of the transceiver according to one of the first and second operational modes, by setting the operational mode of the transceiver based on the information in the wireless message;

said transceiver including a transmitter portion configured to receive one or more operational parameters from a controller, the transmitter portion including an adjustable digital to analog converter having a sampling rate that is determined by one of the one or more operational parameters, said transceiver further including a receiver portion configured to receive one or more operational parameters from the controller, the receiver portion including an adjustable analog to digital converter having a sampling rate that is determined by one of the one or more operational parameters;

wherein the first and second operational modes operate at a different data rate.

34. An apparatus, comprising:

a single transceiver configured to operate in a first operational mode corresponding to a first wireless link type, and a second operational mode corresponding to a second wireless link type based on operational parameters of the transceiver, the transceiver receiving a wireless message across a wireless network in the first wireless link type, for reservation of spectrum in the second wireless link type to increase data transfer rate, the message containing information indicating a particular configuration of the transceiver corresponding to the second wireless link type; and a host configured for running an application and outputting directives;

a database coupled to the host, configured to output operational parameters corresponding to the first and second operational modes, in response to the directives;

a controller coupled to the host, the database, and the transceiver, configured to selectively activate one of the first and second operational modes of the transceiver by changing the operational parameters of the transceiver to adjust the transceiver according to one of the first and second operational modes, by setting the operational mode of the transceiver based on the information in the wireless message;

said transceiver including a transmitter portion configured to receive one or more operational parameters from the controller, the transmitter including a digital to analog converter having a sampling rate that is determined by one of the one or more operational parameters, said transceiver including a receiver portion configured to receive one or more operational parameters from the controller, the receiver including an analog to digital converter having a sampling rate that is determined by one of the one or more operational parameters;

wherein the first and second operational modes operate at a different data rate.

35. A radio, comprising:

a transmitter portion configured to operate in a first operational mode corresponding to a first wireless link type and a second operational mode corresponding to a second wireless link type based on operational parameters of the transmitter portion, the radio receiving a wireless message across a wireless network in the first wireless link type, for reservation of spectrum in the second wireless link type to increase data transfer rate, the message containing information indicating a particular configuration of the transmitter corresponding to the second wireless link type; and a receiver portion configured to operate in said first operational mode corresponding to said first wireless link type and said second operational mode corresponding to said second wireless link type based on operational parameters of the receiver portion the wireless message containing information indicating a particular configuration of the receiver corresponding to either the first or the second wireless link type;

wherein the transmitter portion and receiver portions are capable to operate according to different short range wireless communications link types based on one or more received operational parameters by setting the operational mode of the transmitter and receiver portions based on the information in the wireless message;

said transmitter portion configured to receive one or more operational parameters from a controller, the transmitter including a digital to analog converter having a sampling rate that is determined by one of the one or more operational parameters.

36. A non-transitory computer-readable memory containing computer program instructions recorded thereon for enabling a processor in a computer system, the computer program logic comprising:

program instructions for enabling the processor to selectively activate one of a first and second operational modes of a transceiver, wherein the first operational mode corresponds to a first wireless link type, and the second operational mode corresponds to a second wireless link type, the transceiver receiving a wireless message across a wireless network in the first wireless link type, for reservation of spectrum in the second wireless link type to increase data transfer rate, the message containing information indicating a particular configuration of the transceiver corresponding to the second wireless link type, by changing operational parameters of the transceiver to adjust characteristics of the transceiver according to one of the first and second operational modes, by setting the operational mode of the transceiver based on the information in the wireless message;

said transceiver including a transmitter portion configured to receive one or more operational parameters from a controller, the transmitter portion including a digital to analog converter having a sampling rate that is determined by one of the one or more operational parameters, said transceiver further including a receiver portion configured to receive one or more operational parameters from the controller, the receiver portion including an analog to digital converter having a sampling rate that is determined by one of the one or more operational parameters;

wherein the first and second operational modes operate at a different data rate.

37. An apparatus, comprising:

a transmitter configured to operate in a first operational mode corresponding to a first wireless link type, and a second operational mode corresponding to a second wireless link type based on operational parameters of the transmitter, the apparatus receiving a wireless message across a wireless network in the first wireless link type, for reservation of spectrum in the second wireless link type to increase data transfer rate, the message containing information indicating a particular configuration of the transmitter corresponding to the second wireless link type;

said transmitter configured to selectively activate one of the first and second operational modes by changing the operational parameters to adjust characteristics of the transmitter according to one of the first and second operational modes, by setting the operational mode of the transmitter based on the information in the wireless message;

said transmitter including a digital to analog converter having a sampling rate that is determined by one of the one or more operational parameters, wherein the first and second operational modes operate at a different data rate.

38. A method, comprising:

operating a transmitter in a first operational mode corresponding to a first wireless link type, and a second operational mode corresponding to a second wireless link type based on operational parameters, by receiving a wireless message across a wireless network in the first wireless link type, for reservation of spectrum in the second wireless link type to increase data transfer rate, the message containing information indicating a particular configuration of the transmitter corresponding to the second wireless link type;

selectively activating one of the first and second operational modes by changing the operational parameters to adjust characteristics of the transmitter according to one of the first and second operational modes, by setting the operational mode of the transmitter based on the information in the wireless message; and determining a sampling rate of a digital to analog converter in said transmitter, said sampling rate determined by one of the one or more operational parameters, wherein the first and second operational modes operate at a different data rate.

39. An apparatus, comprising:

a receiver configured to operate in a first operational mode corresponding to a first wireless link type, and a second operational mode corresponding to a second wireless link type based on operational parameters of the receiver, the receiver receiving a wireless message across a wireless network in the first wireless link type, for reservation of spectrum in the second wireless link type to increase data transfer rate, the message containing information indicating a particular configuration of the transceiver corresponding to the second wireless link type;

said receiver configured to selectively activate one of the first and second operational modes of the receiver by changing the operational parameters of the receiver to adjust characteristics of the receiver according to one of the first and second operational modes, by setting the operational mode of the receiver based on the information in the wireless message;

said receiver configured to receive one or more operational parameters, the receiver including an analog to digital converter having a sampling rate that is determined by one of the one or more operational parameters;

wherein the first and second operational modes operate at a different data rate.

40. A method, comprising:

operating a receiver in a first operational mode corresponding to a first wireless link type, and a second operational mode corresponding to a second wireless link type based on operational parameters of the receiver, the receiver receiving a wireless message across a wireless network in the first wireless link type, for reservation of spectrum in the second wireless link type to increase data transfer rate, the message containing information indicating a particular configuration of the receiver corresponding to the second wireless link type;

selectively activating one of the first and second operational modes of the receiver by changing the operational parameters of the receiver to adjust characteristics of the receiver according to one of the first and second operational modes, by setting the operational mode of the receiver based on the information in the wireless message; and determining a sampling rate of an analog to digital converter in said receiver configured to receive one or more operational parameters, said sampling rate determined by one of the one or more operational parameters;

wherein the first and second operational modes operate at a different data rate.

* * * * *